(12) United States Patent
Donmez et al.

(10) Patent No.: US 10,145,348 B2
(45) Date of Patent: Dec. 4, 2018

(54) PRESSURE LIMITING VALVE

(71) Applicant: DELPHI TECHNOLOGIES IP LIMITED, St. Michael (BB)

(72) Inventors: Mehmet Donmez, Izmir (TR); Guillaume Trenado, Les Montils (FR); Onur Mehmet Tansug, Izmir (TR)

(73) Assignee: DELPHI TECHNOLOGIES IP LIMITED (BB)

( * ) Notice: Subject to any disclaimer, the term of this patent is extended or adjusted under 35 U.S.C. 154(b) by 28 days.

(21) Appl. No.: 15/321,469

(22) PCT Filed: Jun. 9, 2015

(86) PCT No.: PCT/EP2015/062772
§ 371 (c)(1),
(2) Date: Dec. 22, 2016

(87) PCT Pub. No.: WO2016/000913
PCT Pub. Date: Jan. 7, 2016

(65) Prior Publication Data
US 2017/0138327 A1 May 18, 2017

(30) Foreign Application Priority Data
Jun. 30, 2014 (GB) .................................. 1411598.4

(51) Int. Cl.
*F02M 63/02* (2006.01)
*F02M 55/02* (2006.01)
(Continued)

(52) U.S. Cl.
CPC ........ *F02M 63/023* (2013.01); *F02M 55/025* (2013.01); *F02M 61/168* (2013.01);
(Continued)

(58) Field of Classification Search
CPC ............... F02M 63/023; F02M 63/005; F02M 2200/8076; F16K 17/06
(Continued)

(56) References Cited

U.S. PATENT DOCUMENTS

| 6,405,711 | B1 | 6/2002 | Smith et al. |
| 7,533,656 | B2 | 5/2009 | Dingle |

(Continued)

FOREIGN PATENT DOCUMENTS

| DE | 102007019076 A1 | 10/2008 |
| DE | 102009032850 A1 | 1/2011 |

(Continued)

*Primary Examiner* — Hieu T Vo
*Assistant Examiner* — Arnold Castro
(74) *Attorney, Agent, or Firm* — Joshua M. Haines

(57) ABSTRACT

A high pressure container arrangement includes a reservoir having an outer wall and an over pressure relief orifice through which high pressure fluid may flow when the fluid pressure inside the reservoir exceeds a predetermined pressure threshold. The high pressure container arrangement also includes a pressure limiting valve having a housing in which is arranged a closing member permanently biased by a spring toward a closed position and, when the pressure in the reservoir exceeds the predetermined threshold the closing member is pushed in an open position. The housing of the pressure limiting valve is integral to the wall of the reservoir.

5 Claims, 3 Drawing Sheets

(51) Int. Cl.
*F02M 63/00* (2006.01)
*F16K 17/06* (2006.01)
*F02M 61/16* (2006.01)

(52) U.S. Cl.
CPC .......... *F02M 63/005* (2013.01); *F16K 17/06* (2013.01); *F02M 63/0225* (2013.01); *F02M 2200/507* (2013.01); *F02M 2200/8076* (2013.01)

(58) Field of Classification Search
USPC ........................................ 123/447, 456, 458
See application file for complete search history.

(56) References Cited

U.S. PATENT DOCUMENTS

| | | | |
|---|---|---|---|
| 8,302,621 B2 * | 11/2012 | Schniederjan | F16K 17/044 137/493.3 |
| 2003/0047168 A1 | 3/2003 | Frank | |
| 2003/0106591 A1 * | 6/2003 | Saurwein | F16K 17/06 137/540 |
| 2014/0060672 A1 | 3/2014 | Gomola | |
| 2014/0196796 A1 * | 7/2014 | Dupont | F02M 51/005 137/15.18 |
| 2014/0369874 A1 * | 12/2014 | Hines | F16K 15/03 417/559 |

FOREIGN PATENT DOCUMENTS

| | | |
|---|---|---|
| DE | 102011087617 A1 | 2/2013 |
| EP | 1898084 A1 | 3/2008 |
| EP | 2072802 A1 | 6/2009 |
| EP | 2110543 B1 | 10/2009 |
| GB | 641722 A1 | 8/1950 |

* cited by examiner

PRESSURE LIMITING VALVE

CROSS REFERENCE TO RELATED APPLICATIONS

This application is a national stage application under 35 USC 371 of PCT Application No. PCT/EP2015/062772 having an international filing date of Jun. 9, 2015, which is designated in the United States and which claimed the benefit of GB Patent Application No. 1411598.4 filed on Jun. 30, 2014 the entire disclosures of each are hereby incorporated by reference in their entirety.

TECHNICAL FIELD

The present invention relates to a high pressure container provided with a pressure limiting valve. The invention is more particularly related to a direct injection common rail provided with a limiting valve.

BACKGROUND OF THE INVENTION

Most high pressure reservoirs are provided with pressure limiting valve in order to ensure that pressure inside the reservoir does not exceed a predetermined pressure threshold. The high pressure reservoir of a direct fuel injection equipment is a so commonly called "common rail" and is generally an elongated tubular member having a thick wall with a high pressure inlet, for the fuel to get in the rail and, a plurality of outlets for delivering fuel to injectors. The rail is further provided with a pressure relief orifice extending through a portion of the wall of the rail, the opening and closing of the orifice being controlled by a pressure limiting valve.

The valve is a standalone mechanical equipment and, the pressure threshold at which a closing member moves from a closed position to an open position is set by the force of a biasing spring so, when the pressure in the rail reaches the threshold, the opening force generated by the fuel on the closing member exceeds the opposed closing force of the biasing spring. The member is pushed in the open position and fuel is enabled to exit the rail via the relief orifice then to flow out via a low pressure outlet.

The valve is, as standalone equipment, the housing of the valve is fixedly arranged on the rail obliging to complementary geometries on both the rail and valve. Such obligation increases technical complexity and associated cost. Furthermore, the adjustment parameters for tuning the pressure threshold are set on a small batch of valves then, the setting is reproduced on all valves, which are individually checked. The statistic distribution of actual pressure threshold over the entire production of valves has distribution tails with rejected valves which individual threshold are out of specification.

SUMMARY OF THE INVENTION

Accordingly, it is an object of the present invention to resolve the above mentioned problems in providing a high pressure container arrangement comprising the assembly of reservoir and a pressure limiting valve. The reservoir has an outer wall, an inlet, for filling the reservoir with high pressure fluid, at least one outlet, for delivering high pressure fluid to a fluid consuming device and, an over pressure relief orifice through which high pressure fluid may flow when the fluid pressure inside the reservoir exceeds a predetermined pressure threshold.

The pressure limiting valve comprises a housing in which is arranged a closing member, permanently biased by a spring toward a closed position where said member, is in sealing contact against a valve seat surrounding said relief orifice forbidding fluid to flow through said orifice. When the pressure in the reservoir exceeds the predetermined threshold the closing member is pushed by the high pressure fluid away from the valve seat in an open position enabling fluid to exit the reservoir via said relief orifice. The pressure in the reservoir decreases as the fluid exiting the reservoir via the relief orifice flows through a low pressure outlet that is connectable to a drain circuit. The pressure threshold is determined by the biasing force of the spring pushing the closing member in a closing direction, opposed to the pressure in the reservoir applying on the cross section of the relief orifice an opening force on the closing member.

Advantageously, the housing of the valve is integral to the wall of the reservoir. This enables material saving relative to the prior art.

The over pressure relief orifice extends through an inner wall integral to the outer wall of the reservoir, said inner wall limiting, or delimiting, or separating, on a first side the reservoir and on the opposite second side the pressure limiting valve. The outer wall extends beyond said inner wall in a tubular shroud forming the housing of the valve in which are arranged the closing member and the spring. A major advantage is that only the relief orifice needs to be sealed by the closing member. In the prior art, where the stand-alone valve is fixed on the reservoir, the valve comprises a seat member and two sealing area are necessary. At first, through the relief orifice, but also between the seat member and the surface of the reservoir against which the valve abuts. By saving one sealing area the present invention provides great advantages.

The arrangement further comprises a plug closing the shroud, the spring being compressed between said plug and the closing member.

The plug is threaded onto the housing so that the biasing force generated by the spring on the closing member is adjustable. This present the advantage over the prior art to enable adjustment of the threshold pressure on each product, while on the prior art where the valve is a stand-alone component which housing is screwed on the reservoir, the setting of the threshold pressure cannot be done unitary.

In one embodiment, the low pressure outlet is advantageously integrally formed in the housing of the valve.

In another embodiment, the low pressure outlet is integrally formed in the plug.

The invention specifically applies to a common rail arrangement for use in a direct injection system of an internal combustion engine. The common rail arrangement comprises a rail having a tubular shape extending along a longitudinal axis and a pressure limiting valve arranged to limit to a predetermined threshold the pressure of the fuel inside the rail. The common rail arrangement is arranged as a high pressure container arrangement as set in any of the preceding paragraphs, the wall of the rail and the housing of the valve being integral.

In one embodiment, the valve is longitudinally arranged at an extremity of the rail and, in another embodiment the valve is radially arranged relative to the rail.

BRIEF DESCRIPTION OF THE DRAWINGS

The present invention is now described by way of example with reference to the accompanying drawings in which.

DESCRIPTION OF THE PREFERRED EMBODIMENTS

Figure 1:
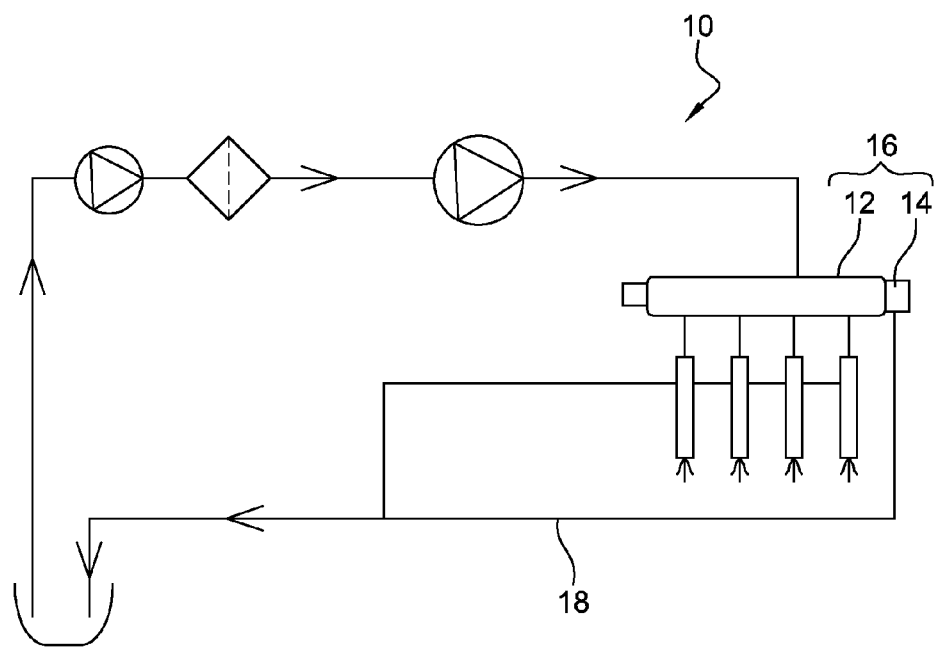
FIG. 1 is schematic view of a simplified fuel injection equipment.

Fuel injection equipment 10, as generally presented in FIG. 1, comprises a high pressure pump pressurizing fuel and filling a common rail 12 that in turn delivers fuel to a plurality of injectors. A pressure limiting valve 14, fixed at the extremity of the rail 12, opens when a predetermined pressure threshold is attained inside the rail 12. This enables fuel to exit the rail 12 and flow toward a low pressure return circuit 18 diminishing the pressure inside the rail 12.

Figure 2:
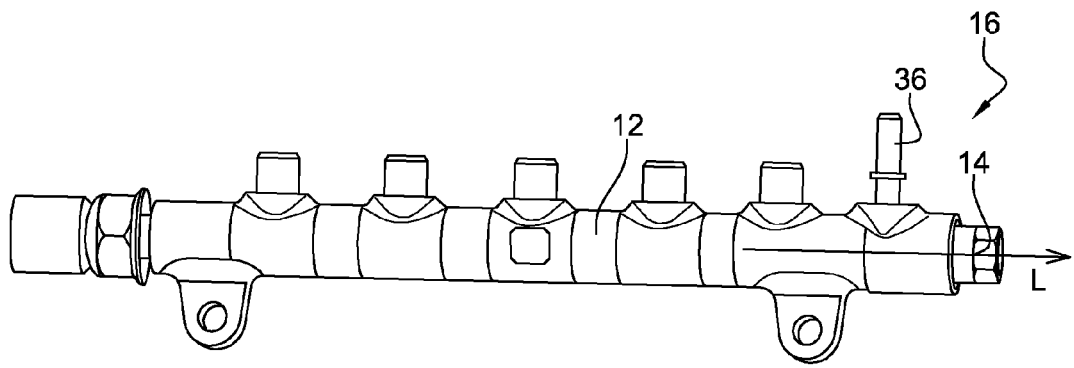
FIG. 2 is a longitudinal view of a rail and limiting valve assembly as per the invention.
Figure 3:
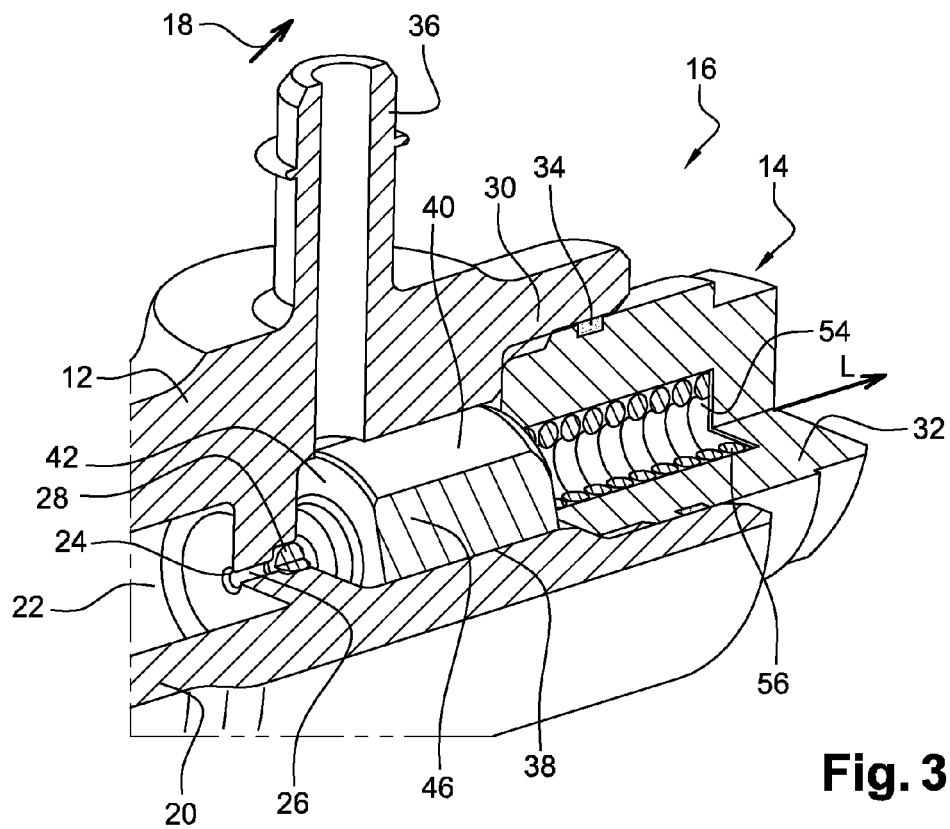
FIG. 3 is a detail cut-out of a pressure limiting valve arranged on the assembly of FIG. 2.
Figure 4:
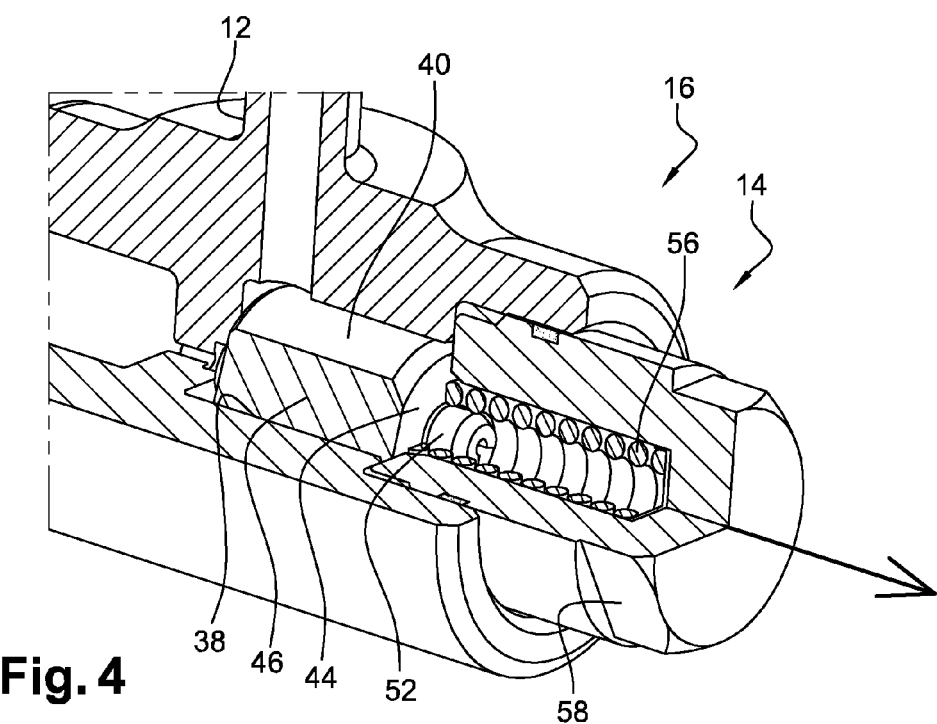
FIG. 4 is another view of the cut-out of FIG. 3.

A first embodiment of the invention is now described in reference to FIGS. 2, 3 and 4 where the invention focuses on the rail 12 and the pressure valve 14 as part of a high pressure integral arrangement 16. As observable on the figures, the rail 12 has a general tubular shape extending along a longitudinal axis L. The rail 12 has a thick outer wall 20 enabling an inner reservoir 22 to withstand pressures of several thousand bars. The reservoir's extremity is delimited by an inner wall 24 centrally provided with a pressure relief orifice 26 extending through said inner wall 24. The inner wall 24 has a reservoir side and an opposed valve side where the opening of the relief orifice 26 defines a valve seat 28 surrounding said orifice 26.

The outer wall 20 of the rail 12 longitudinally extends beyond the inner wall 24 in an open tubular portion integrally forming the housing 30 of the pressure valve 14. The open extremity of said housing 30 is sealingly closed by a plug 32 screwed in on the extremity of the extending tubular portion of the wall and as visible on the figures an O-ring 34 insures sealing of the assembly. An outlet pipe connection member 36 is further provided integral to the outer wall 20 and it extends radially from the inside of the housing 30. The valve housing 30, that is part of the wall 20, is internally provided with an axial bore 38 in which is slidably arranged a piston 40. The piston 40 is cylindrical in shape and extends longitudinally from a front face 42, facing the inner wall 24, to a back face 44, facing the plug 32. The piston 40 is slidably guided inside the bore 38 and it is provided with a flat portion 46 extending on its external face from the front face 42 to the back face 44.

The front face 42 of the piston is centrally provided with a feature enable to a sealingly complementary engage the valve seat 28. In the embodiments presented, although multiple alternatives exit, the valve seat 28 is a small cylindrical recess 48 at the bottom of which opens the relief orifice 26 and, a ball 50 is arranged in the recess 48 and is pressed by the piston 40 so that the ball 50 closes the orifice 26. On its back face 44, the piston is provided with a central cylindrical protrusion 52 and, as visible on the figures, the plug 32 is provided with a longitudinal blind recess 54 in which a spring 56 is compressed between the back face 44 of the piston, where it is centrally maintained as the last turns of the spring 56 engage over the cylindrical protrusion 52 and, the bottom of said blind recess 54. On its external face, the plug 32 is provided with a hexagonal portion 58 for complementary engagement with a wrench needed to screw the plug 32 onto the extremity of the housing 30.

Figure 5:
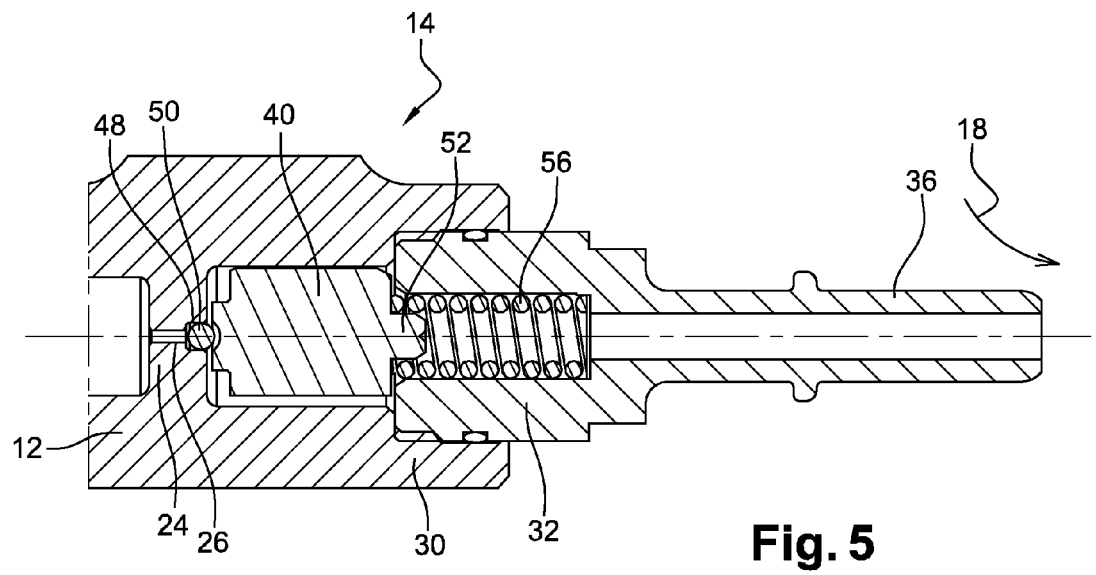
FIG. 5 is a longitudinal section of a second embodiment of the invention.
Figure 6:
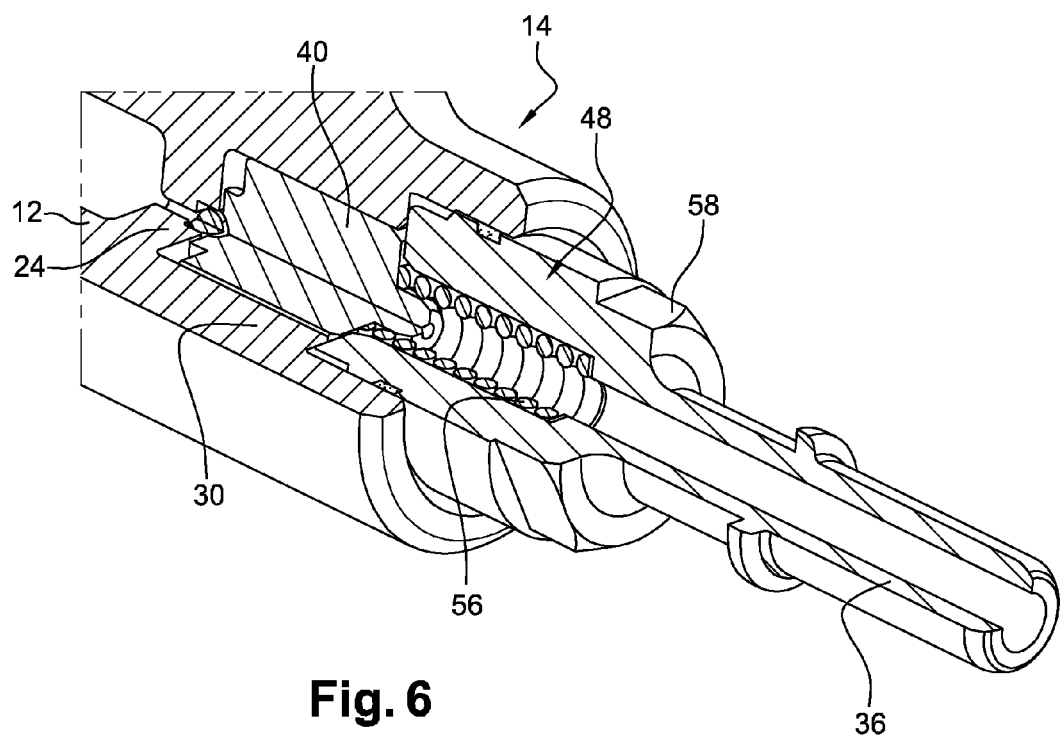
FIG. 6 is a detail cut-out of a pressure limiting valve arranged on the assembly of FIG. 5.

A second embodiment is now briefly presented in referenced to FIGS. 5 and 6. The only difference with the first embodiment is the outlet pipe 36 extension that, in the first embodiment is integral to the housing 30 of the valve, and in the second embodiment, is integral to the plug 32. As visible on the figures, the outlet pipe 36 longitudinally extends from the plug 32, opening internally in the bottom of the cylindrical recess 48, an annular step face 60 being formed and said recess bottom, the spring 56 abutting on that step face 60.

Operation of the integral rail and valve assembly 16 is now briefly described.

Fuel at high pressure fills the reservoir 22 and is, from there, delivered to fuel injectors. The piston 40 is biased by the spring 50 in a closed position and the relief orifice 26 is sealed by the ball 50.

The high pressure fuel in the rail 12 generates on the ball 50, or directly on the piston 40 if the embodiment is made without ball, an opening force. When the pressure inside the reservoir 22 reaches a threshold, the opening force exceeds the spring closing force and the fuel pushes the piston away from the valve seat enabling fuel to exit the rail and to flow toward the low pressure return circuit 18. As soon as the pressure in the rail 12 has diminished below said threshold, the closing force becomes predominant over the opening force and the piston closes the relief orifice again.

From a manufacturing and assembly stand point, the rail and valve integral arrangement 16 is of high interest as a method 100 comprises the following steps:

forging 110 a single blank rail so that the outer wall 20, the inner wall 24 and the valve housing 30 are integrally formed;

machining 120 the longitudinal bore 48, the relief orifice 26, the valve seat 28;

providing and arranging 130 the valve components such as ball 50, piston 40, spring 56, O-ring 34 and plug 32 in the longitudinal bore 48;

screwing 140 the plug 32;

testing 150 the assembly measuring the pressure threshold;

adjusting 160 said threshold by screwing, or un screwing, the plug 32.

The following references have been utilized in this description:

10 fuel injection equipment
 12 rail
 14 pressure limiting valve
 16 high pressure integral arrangements
 18 low pressure return circuit
 20 outer wall
 22 reservoir
 24 inner wall
 26 pressure relief orifice
 28 valve seat
 30 housing of the pressure valve
 32 plug
 34 O-ring
 36 outlet pipe
 38 longitudinal bore
 40 piston—closing member
 42 front face of the piston
 44 back face of the piston
 46 flat portion
 48 cylindrical recess 50 ball
52 cylindrical protrusion
54 blind recess in the cap nut
56 spring
58 hexagonal portion of the cap nut
60 annular step face
100 method of manufacturing and assembly
110 forging a blank for the rail
120 machining
130 arranging
140 screwing
L longitudinal axis

The invention claimed is:

1. A high pressure container arrangement comprising:
a reservoir having an outer wall, an inlet which fills the reservoir with high pressure fluid, at least one outlet which delivers high pressure fluid to a fluid consuming device, and an over pressure relief orifice through which high pressure fluid flows when the fluid pressure inside the reservoir exceeds a predetermined pressure threshold; and
a pressure limiting valve comprising a housing integral to the reservoir in which is arranged a closing member permanently biased by a spring toward a closed position where the closing member is in sealing contact against a valve seat surrounding the over pressure relief orifice forbidding fluid to flow through the over pressure relief orifice and, when the pressure in the reservoir exceeds the predetermined threshold the closing member is pushed by the high pressure fluid away from the valve seat in an open position, enabling fluid to exit the reservoir via the over pressure relief orifice so that, the pressure in the reservoir decreases, the fluid exiting the reservoir via the over pressure relief orifice flowing through a low pressure outlet connectable to a drain circuit;
wherein the over pressure relief orifice extends through an inner wall integral to the outer wall of the reservoir, the inner wall limiting the reservoir on a first side and limiting the pressure limiting valve on a second side that is opposite the first side, the outer wall extending beyond the inner wall in a tubular shroud forming the housing of the pressure limiting valve in which are arranged the closing member and the spring;
the high pressure container arrangement further comprising a plug closing the tubular shroud, the spring being compressed between the plug and the closing member;
wherein the plug is threaded onto the housing such that a biasing force generated by the spring on the closing member is adjustable.

2. A container arrangement as set in claim 1 wherein the low pressure outlet is integrally formed in the housing of the pressure limiting valve.

3. A common rail arrangement for use in a direct injection system of an internal combustion engine, the common rail arrangement comprising:
a rail having a wall which is tubular shape and extends along a longitudinal axis, the rail also having an inlet which fills the rail with high pressure fuel, at least one outlet which delivers high pressure fuel to the internal combustion engine, and an over pressure relief orifice through which high pressure fuel flows when the fuel pressure inside the rail exceeds a predetermined pressure threshold; and
a pressure limiting valve comprising a housing integral to the wall of the rail and a closing member in the housing and permanently biased by a spring toward a closed position where the closing member is in sealing contact against a valve seat surrounding the over pressure relief orifice forbidding fuel to flow through the over pressure relief orifice and, when the pressure in the reservoir exceeds the predetermined threshold the closing member is pushed by the high pressure fuel away from the valve seat in an open position, enabling fuel to exit the rail via the over pressure relief orifice so that, the pressure in the rail decreases, the fuel exiting the rail via the over pressure relief orifice flowing through a low pressure outlet connectable to a drain circuit;
wherein the over pressure relief orifice extends through an inner wall integral to the outer wall of the reservoir, the inner wall limiting the reservoir on a first side and limiting the pressure limiting valve on a second side that is opposite the first side, the outer wall extending beyond the inner wall in a tubular shroud forming the housing of the pressure limiting valve in which are arranged the closing member and the spring;
the common rail arrangement further comprising a plug closing the tubular shroud, the spring being compressed between the plug and the closing member;
wherein the plug is threaded onto the housing such that a biasing force generated by the spring on the closing member is adjustable.

4. A common rail arrangement as set in claim 3 where the pressure limiting valve is longitudinally arranged at an extremity of the rail.

5. A common rail arrangement as set in claim 3 where the pressure limiting valve is radially arranged relative to the rail.

* * * * *